United States Patent
Peters

[15] 3,635,438
[45] Jan. 18, 1972

[54] POWER-OPERATED CONTROL VALVE

[72] Inventor: Theodore F. Peters, Utica, Mich.
[73] Assignee: General Motors Corporation, Detroit, Mich.
[22] Filed: Oct. 2, 1969
[21] Appl. No.: 863,148

[52] U.S. Cl. ..........................251/137, 251/335 A, 92/103 R
[51] Int. Cl. ......................................................F16k 31/06
[58] Field of Search ..........................251/75, 137, 335.1, 61; 92/103 R

[56] References Cited

UNITED STATES PATENTS

| | | |
|---|---|---|
| 2,602,627 | 7/1952 | Britton..............................251/137 X |
| 1,673,923 | 6/1928 | Snyder.....................................251/75 |
| 1,783,515 | 12/1930 | Montgomery ...........................251/75 |
| 2,084,680 | 6/1937 | Grosswege et al. ................251/137 X |
| 2,469,757 | 5/1949 | Watson..............................251/75 X |
| 2,704,548 | 3/1955 | Ralston..............................92/103 X |
| 3,383,084 | 5/1968 | Mayfield..........................251/137 X |

*Primary Examiner*—Arnold Rosenthal
*Attorney*—E. W. Christen, H. Furman and D. L. Ellis

[57] ABSTRACT

A power-operated control valve for fluid systems includes a pair of electrical solenoids each briefly energizable to move a valve member to a respective open or closed condition thereof, the valve member being bistable in such positions from the influence of a coil spring and a pressure differential responsive diaphragm.

1 Claims, 2 Drawing Figures

PATENTED JAN 18 1972

3,635,438

INVENTOR.
Theodore F. Peters
BY
D. L. Ellis
ATTORNEY

POWER-OPERATED CONTROL VALVE

SPECIFICATION

This invention relates to fluid system control valves and more particularly to an improved power-operated fluid system control valve.

One feature of this invention is that it provides a new and improved fluid system control valve for selectively establishing or closing communication between a source of pressure differential relative to atmosphere and a fluid operated system, the valve being selectively moved between its positions by a pair of electrical solenoids which are only briefly energized for the valve movement whereupon the valve is held in the selected position by holding mechanism incorporating a spring element and a pressure differential responsive element.

Another feature of the invention is that the pressure differential responsive element takes the form of a flexible diaphragm operative in the open position of the valve member to experience a pressure differential relative to atmosphere holding the valve member in such open position against the action of a coil spring or the like normally locating the valve in closed position. Other features of the invention resides in the compact and simplified construction of the valve.

Figure 1:
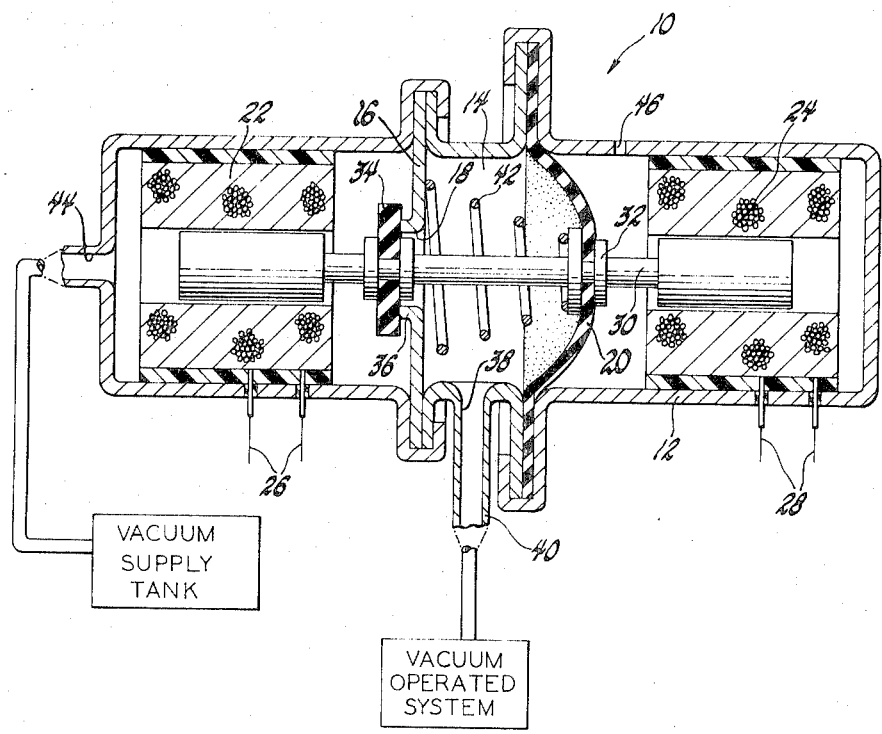
Figure 2:
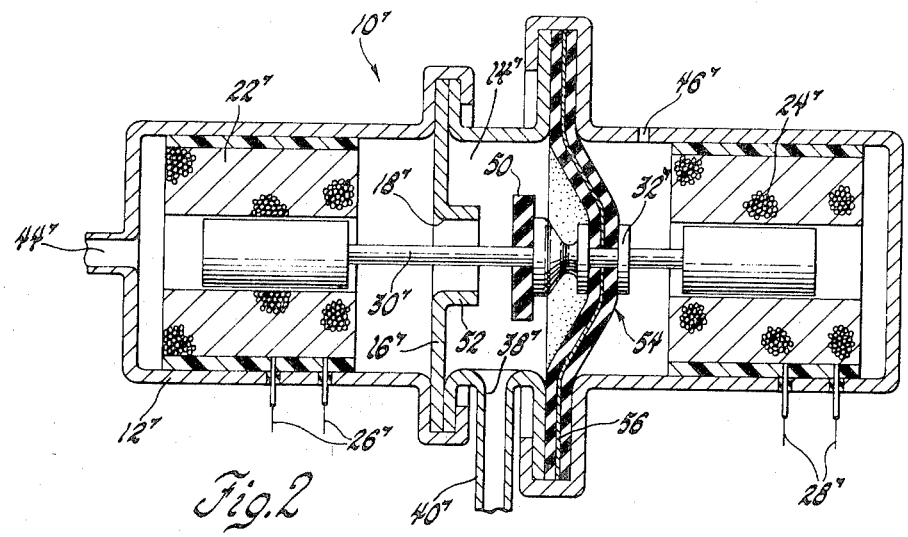

These and other features and advantages of the invention will be readily apparent from the following specification and from the drawings wherein:

FIG. 1 is a partially schematic sectional view of a fluid system control valve according to this invention adapted for use with subatmospheric pressure sources and showing the valve in closed condition; and FIG. 2 is a similar view showing a modification of the invention adapted for use with superatmospheric pressure sources and showing the valve in open position.

Referring particularly to FIG. 1 of the drawings, a fluid system control valve designated generally as 10 is illustrated in a form adapted for use with subatmospheric or vacuum pressure sources and with operating systems in which it is desired that the system be selectively opened and closed to and from communication with the vacuum source. An example of such a system is disclosed in Johnstone et. al. U.S. Pat. No. 3,386,761 issued June 4, 1968 to the assignee of the present invention. In that system, a series of vehicle body door latches and locks are each operated by a respective power actuator selectively energizable from inside or outside the vehicle body by a source of power connected through manual control elements such as switches, the source of power also being independently controlled by a master locking control which may take the form of, for example, an electrical switching arrangement when the system is powered by electrical current, or a valve when the system is powered by a fluid pressure source such as a vacuum tank connected with the vehicle engine intake manifold. In the case of a vacuum powered system in accordance with the particulars of the disclosure of that patent, it has been found highly efficient to additionally apply a master electrical locking circuit to the system controlling the master locking control and specifically providing a pair of solenoids operative to move the valve element of the locking device between its open and closed positions rendering the system operative and inoperative respectively. The succeeding description deals with a preferred embodiment of such a vacuum master locking or control valve for such a system.

The valve 10 includes a valve housing 12 comprising three housing sections suitably flanged and sealedly secured together as by welding to form a cylinder. An intermediate control chamber 14 is defined in the housing by a plate 16 provided with a central aperture defining a first or vacuum supply port 18. The other end of the chamber 14 is defined by a flexible diaphragm of rubber or like material having its marginal edge portion suitably secured in sealing relation within one of the annular flange joints of housing 12. A pair of remotely controllable electrical solenoids 22 and 24 are disposed within housing 12 at opposite sides of chamber 14 and have the coil portions thereof connected respectively with pairs of electric leads 26 and 28 which may be connected each in a separate circuit with a source of electrical current such as a battery and each with a respective normally open control switch, not shown. Extending between the solenoids 22 and 24 through the ports 18 and through chamber 14 is a common armature shaft 30 fixedly connected at 32 with the central portion of diaphragm 20 for unitary movement therewith. A valve disc 34 of hard rubber material or the like is fixedly attached to the shaft 30 and is functional with respect to a valve seat lip 36 formed at port 18. An additional port 38 communicating with chamber 14 is provided by a tubular stem member 40 suitably secured between the flange joints of housing 12. Port 38 leads to a fluid system, such as the vehicle door locking system above described, for operation thereof upon application of vacuum through chamber 14 by opening movement of armature shaft 30 and valve member 34 from the closed position shown in FIG. 1.

The armature shaft and the valve member 34 are urged to the closed position shown in the drawing by a coil spring 42 seating between plate 16 and the connection 32 at diaphragm 20. The strength of the spring is chosen with relation to the effective area of valve member 34 subject to a pressure differential over chamber 14 normally favoring the left side of the valve member due to the subatmospheric pressure of the vacuum supply tank which is communicated to the end chamber containing the left-hand solenoid 22. Such communication is established through a port 44 in the end of housing 12, and it will be appreciated that sufficient clearance is established either through the central bore of the solenoid-receiving armature shaft 30 or optionally through other openings in the body of the solenoid to allow communication between the vacuum supply tank and the port 18.

Assuming the control valve is in the closed condition thereof shown in the drawings, application of vacuum from the supply tank to the vacuum operated system is established by brief energization of solenoid 22 causing leftward movement of valve member 34 and shaft 30 against the action of spring 42 to remove the valve member from seat 36. Once opened, the vacuum applied through port 18 of course communicates directly to operate the system, and it additionally acts upon the left-hand face of diaphragm 20. The right-hand chamber of housing 12 containing solenoid 24 is preferably constantly communicated to atmosphere as by suitable openings at 46, thus to provide a pressure differential across diaphragm 20 creating a force directed leftwardly on armature shaft 30 holding the same displaced in the open condition of the valve member following the brief energization of the solenoid. To again close the valve, brief energization of solenoid 24 of sufficient strength to overcome the pressure differential on the diaphragm aids spring 42 in returning armature shaft 30 rightwardly until valve member 34 again closes against the seat 36. With port 18 closed, a reduction in pressure differential relative to atmosphere across diaphragm 20 should occur to allow spring 42 to again become active in holding the valve member 34 in the closed position. This reduction will, of course, always occur in fluid dynamic systems where, in the case of vacuum, an atmospheric air inlet is provided at the remote end of the system. Even in basically static vacuum systems as well known in the art, sufficient unavoidable system leakage to atmosphere will usually occur enabling this pressure reduction, and the relative sizes of the area of diaphragm 20 and spring 42 are easily adjusted to avail of even only slight amounts of pressure reduction to hold valve member 34 closed. The valve is thus bistable or positively held in its two operating positions but is of an exceedingly simple construction in partaking of the effect of pressure differential on the diaphragm 20 to hold one of the valve positions.

A modification of the invention is shown in FIG. 2 with primed numerals referring to like parts and wherein the valve is adapted for use in systems employing a source of superatmospheric pressure rather than vacuum. The vehicle door locking system of the Johnstone et al. patent may again be exemplary of a typical such system in which pressurized fluid is to be selectively communicated to or closed from the system. Further examples of systems wherein the control valve of the invention is particularly well applied are domestic furnace burner control valves and the like. The valve 10' distinguishes from the previous embodiment in a rearrangement of the valve disc member, designated 50, to be disposed directly within the intermediate chamber 14' and functional with respect to a valve seat 52 on plate 16'. In place of the separate coil spring and diaphragm elements in the previous embodiment, an alternative construction employs a laminated or sandwich diaphragm structure 54 including outer layers of rubber of like flexible material suitable for efficient sealing at the connections of the diaphragm with the housing and armature shaft, such layers being bonded to an intermediate Belleville-type spring or washer formed to create bias in the diaphragm 54 urging the armature shaft 30' leftwardly to a position wherein valve member 50 closes valve seat 52. With the valve 10' conditioned in the closed position, not shown, brief energization of the right-hand solenoid 24' flexes the Belleville spring and moves the armature shaft 30' and valve member 50 rightwardly to the position shown in the drawings, wherein the source of pressurized fluid connected with port 44 is communicated through port 18 to the chamber 14' and the system port 38'. The right-hand side of diaphragm 54, as with the previous embodiment, is exposed to atmospheric pressure so that the superatmospheric pressure thus established in chamber 14' creates a pressure differential across diaphragm structure 54 which holds the latter and armature shaft 30 in the open position against the resistance of the Belleville spring 56. To return the valve 10' to closed condition, solenoid 22' is briefly energized to overcome the pressure differential across the diaphragm and return the valve member 50 to valve seat 52. Thereafter, the absence of substantial pressure differential across the diaphragm structure 54 maintains the valve in closed condition following the energization of the solenoid 22'.

Having thus described the invention what is claimed is:

1. In a power-operated control valve for a fluid system adapted for connection with a source of pressure differential relative to atmosphere, a valve housing defining a chamber in an intermediate portion thereof, a pair of ports opening to said chamber one of which is communicated with said source and defines a valve seat and the other of which is communicated with said system, a pair of solenoids mounted within said housing at opposite sides of said chamber, a common armature extending between said solenoids through said chamber, a valve member mounted on said armature and functional with respect to said valve seat such that energization of one of said solenoids moves said armature and said valve member to an open position communicating said source with said system and energization of the other solenoid moves said armature and said valve member to a closed position, a flexible diaphragm defining one end of said chamber and subject at one side thereof to the pressure in said chamber and subject at the other side thereof to atmospheric pressure continuously, said diaphragm having a larger effective area than that of said valve seat and being operatively connected with said armature such that movement of the latter to the position thereof corresponding to the open position of said valve member communicating said source with said system by brief energization of said one solenoid creates a pressure differential across said diaphragm generating a force thereon operative as the sole force holding said armature in the open position thereof, and resilient means biasing said armature and said valve to the closed position thereof and operative to hold the same therein following brief energization of said other solenoid.

* * * * *